United States Patent
Sugahara

(10) Patent No.: US 10,315,346 B2
(45) Date of Patent: Jun. 11, 2019

(54) INJECTION MOLDING MACHINE

(71) Applicant: FANUC CORPORATION, Yamanashi (JP)

(72) Inventor: Keisuke Sugahara, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 196 days.

(21) Appl. No.: 15/609,151

(22) Filed: May 31, 2017

(65) Prior Publication Data

US 2017/0355116 A1 Dec. 14, 2017

(30) Foreign Application Priority Data

Jun. 13, 2016 (JP) .................................. 2016-116801

(51) Int. Cl.
    *B29C 45/17* (2006.01)
    *B29C 45/64* (2006.01)
    (Continued)

(52) U.S. Cl.
    CPC .......... *B29C 45/1761* (2013.01); *B29C 45/07* (2013.01); *B29C 45/13* (2013.01);
    (Continued)

(58) Field of Classification Search
    CPC ..... B29C 45/1761; B29C 45/07; B29C 45/13; B29C 45/1777; B29C 45/16;
    (Continued)

(56) References Cited

U.S. PATENT DOCUMENTS 3,773,450 A * 11/1973 Svanfors ............... B29C 45/062
                                                        425/130
3,817,679 A *  6/1974 Ruegg .................... B29C 45/13
                                                        425/192 R
(Continued)

FOREIGN PATENT DOCUMENTS

JP           7144356 A    6/1995
JP          10249890 A    9/1998
(Continued)

OTHER PUBLICATIONS

Untranslated Decision to Grant a Patent mailed by Japan Patent Office (JPO) for Application No. JP 2016-116801, dated Sep. 4, 2018, 3 pages.

(Continued)

*Primary Examiner* — Joseph S Del Sole
*Assistant Examiner* — Emmanuel S Luk
(74) *Attorney, Agent, or Firm* — Fredrikson & Byron, P.A.

(57) ABSTRACT

An injection molding machine includes a sub injection device configured to inject molten resin into a mold of a clamping device along a direction perpendicular to an opening/closing direction of the mold, a sub machine base configured to support the sub injection device, and a coupling unit provided on a main machine base configured to support a main injection device and the clamping device and couple the main machine base and the sub machine base together. The coupling unit includes a base provided on the main machine base, two fixed blocks fixed to the base, a guide bar bridged in parallel to the opening/closing direction of the mold by the two fixed blocks, and a movable block slidably fitted onto the guide bar. The movable block is connected to the sub machine base.

15 Claims, 14 Drawing Sheets

(51) Int. Cl.
  *B29C 45/13* (2006.01)
  *B29C 45/07* (2006.01)
  *B29K 105/00* (2006.01)
  *B29C 45/16* (2006.01)

(52) U.S. Cl.
  CPC .......... *B29C 45/1777* (2013.01); *B29C 45/64* (2013.01); *B29C 45/16* (2013.01); *B29C 2045/1685* (2013.01); *B29C 2045/1767* (2013.01); *B29K 2105/0067* (2013.01)

(58) Field of Classification Search
  CPC .... B29C 2045/1685; B29C 2045/1767; B29C 45/77; B29C 45/84; B29K 2105/0067
  See application file for complete search history.

(56) References Cited

U.S. PATENT DOCUMENTS

| | | | | |
|---|---|---|---|---|
| 5,916,604 | A * | 6/1999 | Oshiro | B29C 45/07 264/328.11 |
| 10,099,415 | B2 * | 10/2018 | Tanaka | B29C 45/77 |
| 2006/0127528 | A1 * | 6/2006 | Schmidt | B29C 45/07 425/574 |
| 2006/0244178 | A1 * | 11/2006 | Armbruster | B29C 45/006 264/255 |
| 2007/0212445 | A1 * | 9/2007 | Wimberger | B29C 45/045 425/576 |
| 2009/0291162 | A1 * | 11/2009 | Wenzin | B29C 45/03 425/567 |
| 2010/0112120 | A1 * | 5/2010 | Kitta | B29C 45/1761 425/542 |
| 2011/0142982 | A1 * | 6/2011 | Kitta | B29C 45/1761 425/542 |
| 2016/0023391 | A1 * | 1/2016 | Nishizawa | B29C 45/1744 425/575 |
| 2016/0101559 | A1 * | 4/2016 | Uchiyama | B29C 45/13 700/201 |
| 2016/0243741 | A1 * | 8/2016 | Uchiyama | B29C 45/7666 |
| 2016/0288393 | A1 * | 10/2016 | Tanaka | B29C 45/77 |

FOREIGN PATENT DOCUMENTS

| | | |
|---|---|---|
| JP | 2002205315 A | 7/2002 |
| JP | 20041403 A | 1/2004 |
| JP | 200775999 A | 3/2007 |
| JP | 201678384 A | 5/2016 |

OTHER PUBLICATIONS

English Machine Translation of Decision to Grant a Patent mailed by Japan Patent Office (JPO) for Application No. JP 2016-116801, dated Sep. 4, 2018, 3 pages.

Untranslated Notification of Reasons for Refusal mailed by Japan Patent Office (JPO) for Application No. JP 2016-116801, dated Jun. 26, 2018, 2 pages.

English Machine Translation of Notification of Reasons for Refusal mailed by Japan Patent Office (JPO) for Application No. JP 2016-116801, dated Jun. 26, 2018, 2 pages.

English Abstract and Machine Translation for Japanese Publication No. 10-249890 A, published Sep. 22, 1998, 10 pgs.

English Abstract and Machine Translation for Japanese Publication No. 2016-078384 A, published May 16, 2015, 8 pgs.

English Abstract and Machine Translation for Japanese Publication No. 2007-075999 A, published Mar. 29, 2007, 11 pgs.

English Abstract and Machine Translation for Japanese Publication No. 2004-001403 A, published Jan. 8, 2004, 11 pgs.

English Abstract and Machine Translation for Japanese Publication No. 2002-205315 A, published Jul. 23, 2002, 15 pgs.

English Abstract and Machine Translation for Japanese Publication No. 07-144356 A, published Jun. 6, 1995, 11 pgs.

* cited by examiner

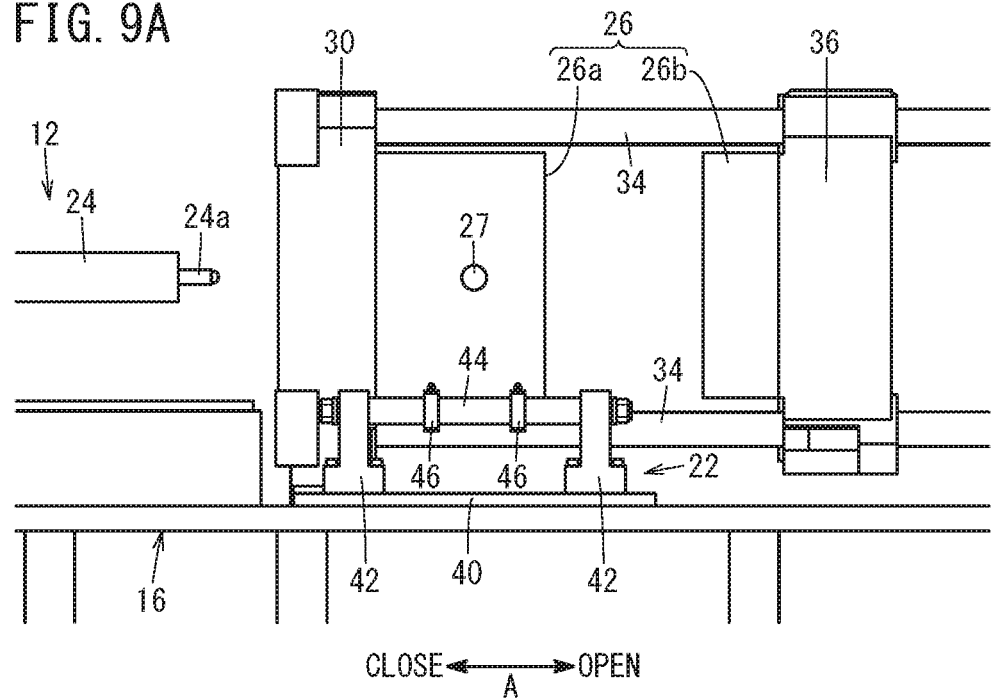
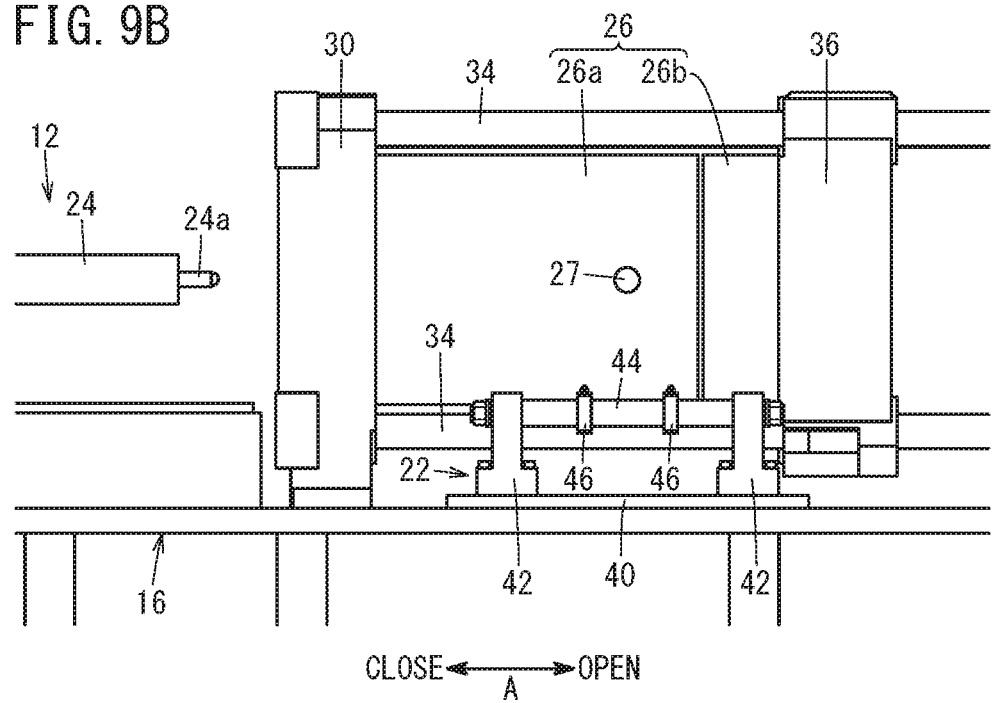

INJECTION MOLDING MACHINE

CROSS-REFERENCE TO RELATED APPLICATION

This application is based upon and claims the benefit of priority from Japanese Patent Application No. 2016-116801 filed on Jun. 13, 2016, the contents of which are incorporated herein by reference.

BACKGROUND OF THE INVENTION

Field of the Invention

The present invention relates to an injection molding machine that includes a clamping device including a mold and which moves the mold in an opening/closing direction, and an injection device for injecting molten resin in the mold along the opening/closing direction of the mold, and further includes a sub injection device for injecting the molten resin in the mold along a direction perpendicular to the opening/closing direction of the mold.

Description of the Related Art

Japanese Laid-Open Patent Publication No. 07-144356 discloses a multicolor molding machine that includes a first injection device for injecting molten resin in a mold along an opening/closing direction of the mold, and a second injection device for injecting the molten resin in the mold along a direction perpendicular to the opening/closing direction of the mold.

Japanese Laid-Open Patent Publication No. 2002-205315 discloses that an injection device and a mold attachment platen of a clamping device are coupled to each other by a coupling unit in order to reduce relative displacement between the injection device and the clamping device due to a pressing force of a nozzle touch and thereby stabilize a nozzle touch state and an injection molding operation.

SUMMARY OF THE INVENTION

Japanese Laid-Open Patent Publication No. 07-144356 does not take into account influences of a pressing force and a reaction force thereof produced when a nozzle of the second injection device touches a mold. Therefore, the nozzle and a sprue bush of the mold are likely to become misaligned, and it is difficult to perform stable injection molding. Further, misalignment of the nozzle of the second injection device and the sprue bush of the mold in a direction (the opening/closing direction of the mold) perpendicular to an injection direction of the second injection device is not taken into account. Therefore, it is not possible to perform position adjustment.

Japanese Laid-Open Patent Publication No. 2002-205315 does not take into account misalignment of a nozzle of the injection device and the sprue bush of the mold in the direction perpendicular to the injection direction of the injection device. Therefore, it is not possible to perform position adjustment.

It is therefore an object of the present invention to provide an injection molding machine that can adjust misalignment of a nozzle of a sub injection device and a sprue bush of a mold while performing stable injection molding in the sub injection device.

According to the present invention, there is provided an injection molding machine that includes: a clamping device including a mold and configured to produce a clamping force by opening and closing the mold; an injection device configured to inject molten resin into the mold along an opening/closing direction of the mold; and a machine base configured to support the clamping device and the injection device, wherein the injection molding machine further includes: a sub injection device configured to inject molten resin into the mold along a direction perpendicular to the opening/closing direction of the mold; a sub machine base configured to support the sub injection device; and a coupling unit provided on the machine base and configured to couple the machine base and the sub machine base together, the coupling unit includes: a base provided on the machine base; two fixed blocks fixed to the base; a guide bar supported by and bridged (extended, suspended) between the two fixed blocks in parallel to the opening/closing direction of the mold; and a movable block slidably fitted onto the guide bar, and the movable block is connected to the sub machine base.

According to this configuration, by the coupling unit that couples the machine base and the sub machine base together, it is possible to adjust a position of the sub injection device in the opening/closing direction of the mold. Further, by the coupling unit, it is possible to completely mechanically balance an action and a reaction accompanying a pressing force of a nozzle touch of the sub injection device between the machine base and the sub machine base. As a result, it is possible to suppress a moment action in a tilting direction of the sub injection device and the nozzle of the sub injection device due to the pressing force of a nozzle touch, and perform stable molding.

In the present invention, the injection molding machine further includes a nozzle touch mechanism configured to move the sub injection device having a nozzle configured to inject molten resin, with respect to the sub machine base in the direction perpendicular to the opening/closing direction of the mold, and thereby cause the nozzle to touch the mold. Consequently, it is possible to cause the nozzle of the sub injection device to touch the mold, and injection molding can be performed by the sub injection device.

In the injection molding machine according to the present invention, the nozzle touch mechanism includes: a ball screw configured to be rotated by driving of a motor and screw-engaged with a screw-engagement portion of the sub injection device; and a coupling support member configured to rotatably support the ball screw and provided on the sub machine base, and the coupling support member is connected to the movable block. With the above feature, the reaction force of the pressing force of the nozzle touch of the sub injection device is transmitted to the machine base via the coupling unit. Consequently, it is possible to completely mechanically balance the action and the reaction of the pressing force of the nozzle touch of the sub injection device between the machine base and the sub machine base.

In the injection molding machine according to the present invention, the sub injection device is supported on the sub machine base with a linear guide bearing portion interposed therebetween, and the linear guide bearing portion is configured to enable movement of the sub injection device with respect to the sub machine base in the direction perpendicular to the opening/closing direction of the mold. Consequently, the sub injection device can perform a nozzle touch operation.

In the injection molding machine according to the present invention, the sub machine base includes: a fixed base; a guide rail provided on the fixed base in parallel to the opening/closing direction of the mold; and a movable base supported on the fixed base with the guide rail interposed therebetween, the movable base being movable in the opening/closing direction of the mold; and the movable base is connected to the coupling unit. Consequently, it is possible to easily adjust the position of the sub injection device with respect to the clamping device in the opening/closing direction of the mold.

In the injection molding machine according to the present invention, the coupling unit further includes a coupling block configured to couple the two fixed blocks and a stationary platen configured to fix a fixed mold of the mold. With the above feature, a force applied to the coupling unit due to a pressing force of the nozzle touch of the sub injection device is dispersed to the machine base and the stationary platen. Consequently, it is possible to reduce the force applied to the machine base. As a result, it is possible to lower rigidity of the machine base.

In the present invention, the injection molding machine further includes a machine base coupling portion configured to couple the machine base and the sub machine base below the coupling unit to maintain a relative position between the machine base and the sub machine base. Consequently, even when rapid acceleration or rapid deceleration of the moving platen of the clamping device causes movement of the position of the machine base, it is possible to maintain the relative position (relative positional relationship) between the machine base and the sub machine base.

According to the present invention, the coupling unit that couples the machine base and the sub machine base makes it possible to adjust the position of the sub injection device in the opening/closing direction of the mold. Further, the coupling unit makes it possible to completely mechanically balance the action and the reaction accompanying the pressing force of the nozzle touch of the sub injection device between the machine base and the sub machine base. As a result, it is possible to suppress the moment action in the tilting direction of the sub injection device and the nozzle of the sub injection device due to the pressing force of the nozzle touch, and perform stable molding.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9A is a view showing an installation example of the coupling unit in an opening/closing direction of a mold in a case of a thin fixed mold;

FIG. 9B is a view showing an installation example of the coupling unit in the opening/closing direction of the mold in a case of a thick fixed mold;

DESCRIPTION OF THE PREFERRED EMBODIMENTS

A preferred embodiment of an injection molding machine according to the present invention will be described in detail below with reference to the accompanying drawings.

Figure 1:
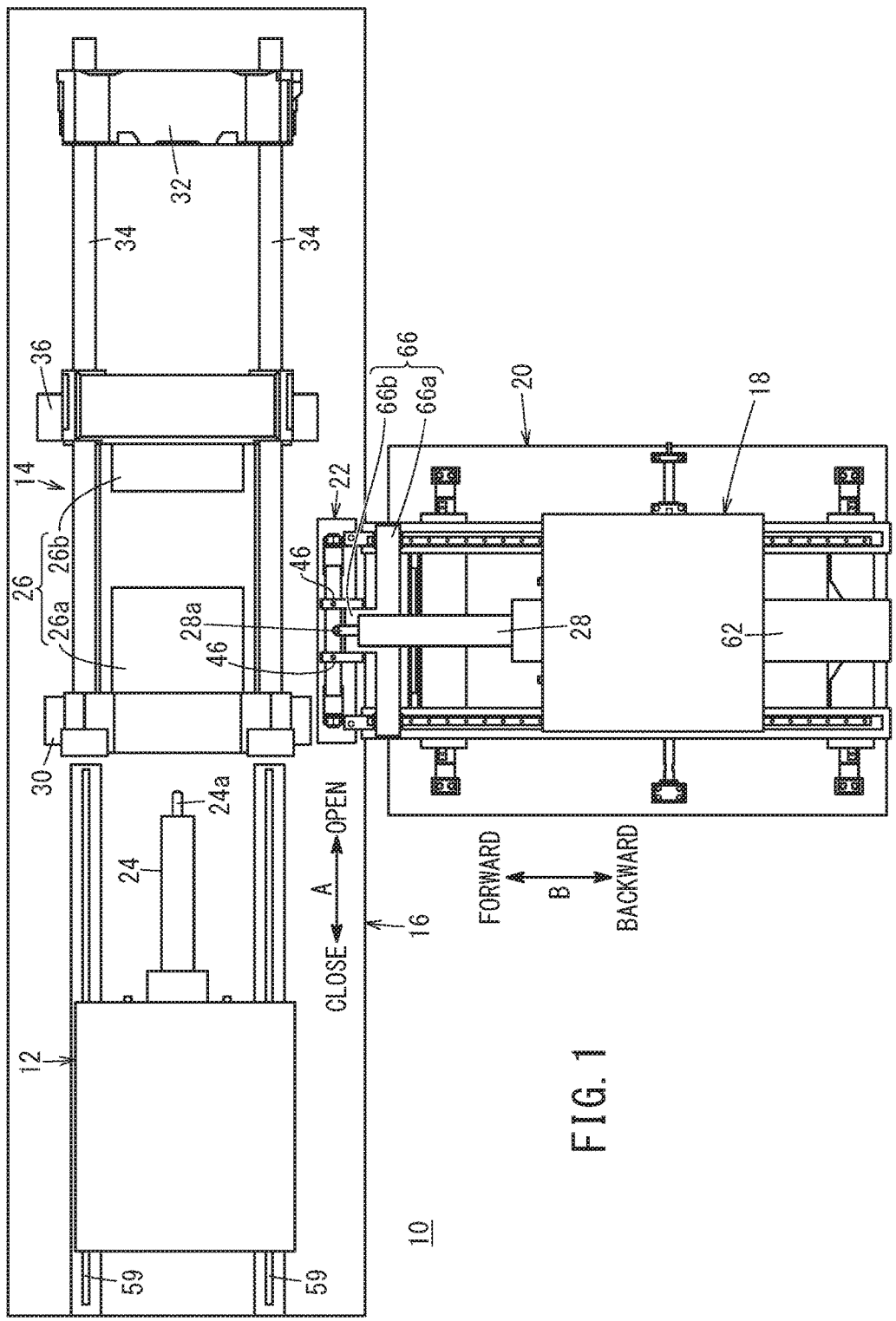
FIG. 1 is an overall plan view showing an injection molding machine according to an embodiment of the present invention, as viewed from above.
Figure 2:
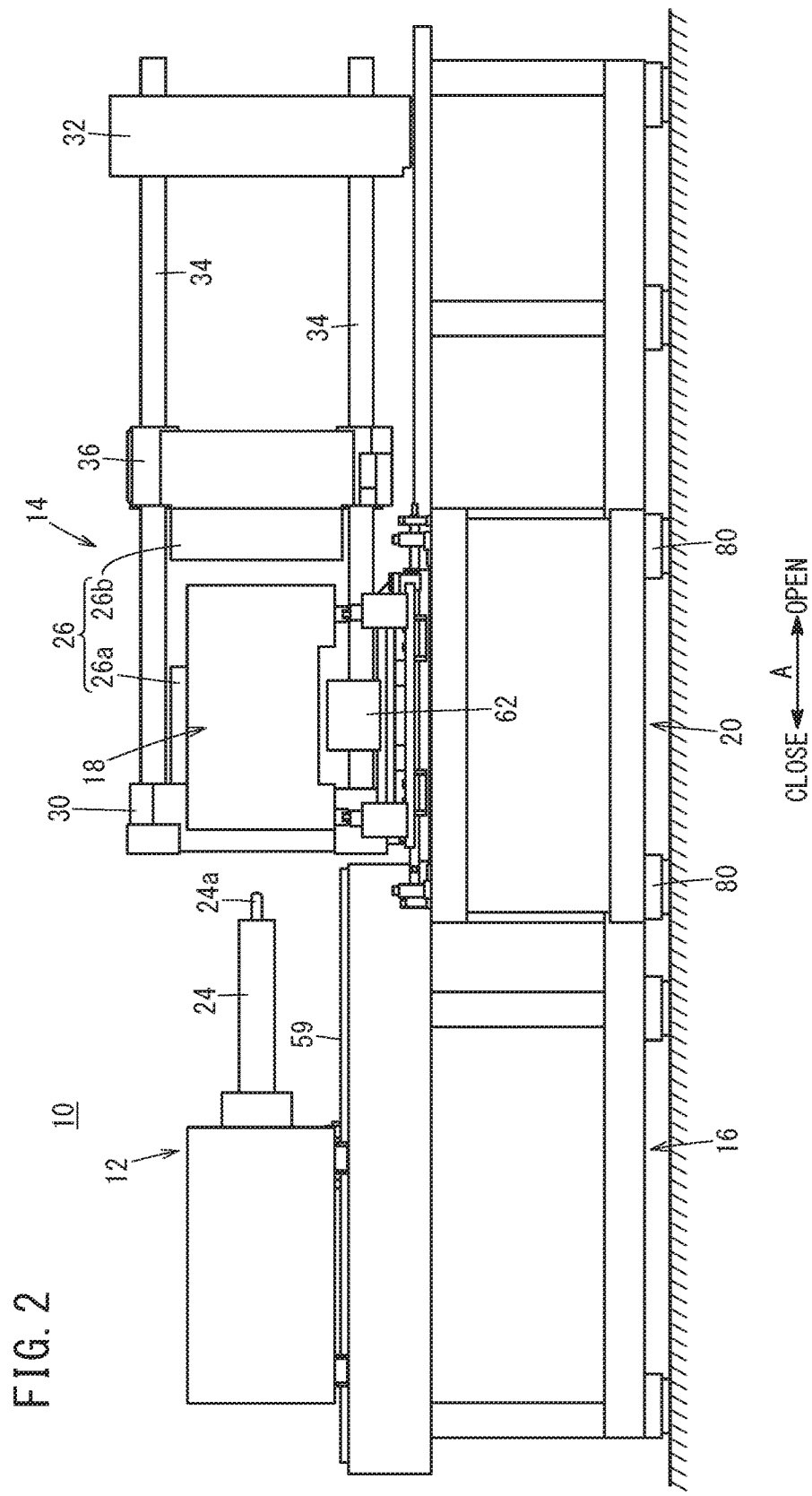
FIG. 2 is an overall side view showing the injection molding machine shown in FIG. 1, as viewed from a side.

FIG. 1 is an overall plan view showing an injection molding machine 10, as viewed from above. FIG. 2 is an overall side view showing the injection molding machine 10, as viewed from a side. The injection molding machine 10 includes an injection device (hereinafter referred to as a main injection device) 12, a clamping device 14, a machine base (hereinafter referred to as a main machine base) 16 that supports the main injection device 12 and the clamping device 14, a sub injection device 18, a sub machine base 20 that supports the sub injection device 18, and a coupling unit 22 that is arranged on the main machine base 16 and couples the main machine base 16 and the sub machine base 20 together.

The main injection device (first injection device) 12 includes an injection cylinder 24, and injects molten resin in the injection cylinder 24 from a nozzle 24a of the injection cylinder 24 into a mold 26 (more specifically, a cavity) of the clamping device 14. The main injection device 12 and the clamping device 14 are disposed on the main machine base (first machine base) 16 so as to face each other along an opening/closing direction (which is referred to as "Direction A" below for ease of description) of the mold 26. An axial direction of the injection cylinder 24 is parallel to Direction A. Hence, the main injection device 12 injects the molten resin in the mold 26 along Direction A (the opening/closing direction of the mold 26).

An injection screw (not shown) is arranged in the injection cylinder 24. When this injection screw moves while rotating toward the mold 26, the molten resin in the injection cylinder 24 is injected from the nozzle 24a into the mold 26. This injection cylinder 24 is heated by a heater or the like, and melts pelleted resin supplied from a hopper (not shown). In this regard, the injection screw is rotated and moved in Direction A by a driving source such as a servo motor (not shown) or the like.

The sub injection device (second injection device) 18 also has the same configuration as that of the main injection device 12. To explain it briefly, the sub injection device 18 also includes an injection cylinder 28, and injects molten resin in the injection cylinder 28 from a nozzle 28a of the injection cylinder 28 into the mold 26 (more specifically a cavity). The sub injection device 18 is disposed on the sub machine base (second machine base) 20 so as to face the clamping device 14 along a direction (referred to as "Direction B" below for ease of description) perpendicular to the opening/closing direction of the mold 26. An axial direction of the injection cylinder 28 is parallel to Direction B. Hence, the sub injection device 18 injects the molten resin in the mold 26 along Direction B (the direction perpendicular to the opening/closing direction of the mold 26).

The clamping device 14 includes the mold 26, and produces a clamping force by opening and closing the mold 26. That is, the clamping device 14 performs operations of opening/closing and clamping the mold 26. More specifically, the mold 26 includes a fixed mold 26a and a movable mold 26b. During molding, the clamping device 14 moves the movable mold 26b in a closing direction (a direction to approach the fixed mold 26a), causes the movable mold 26b to contact the fixed mold 26a, and then further moves the movable mold 26b in the closing direction to thereby perform clamping operation. Further, after molding, the clamping device 14 moves the movable mold 26b in the opening direction and causes the movable mold 26b and the fixed mold 26a to move away from each other. The operation of opening and closing the mold 26 is performed by a driving source such as a servo motor (not shown).

The clamping device 14 includes a fixed platen (stationary platen) 30, a rear platen 32, and a plurality of tie bars 34 that couple the fixed platen 30 and the rear platen 32 together. A movable platen (moving platen) 36 is arranged between the fixed platen 30 and the rear platen 32, and is movable in an axial direction of the tie bars 34 along the plurality of tie bars 34. The fixed mold 26a is attached to a surface of the fixed platen 30 on the movable platen 36 side. The movable mold 26b is attached to a surface of the movable platen 36 on the fixed platen 30 side. Hence, the movable platen 36 moves in the axial direction (Direction A) of the tie bars 34 to open and close the mold 26. This movable platen 36 is moved in the axial direction of the tie bars 34 by a driving mechanism that includes a toggle mechanism and a servo motor, which are not shown.

Figure 3:
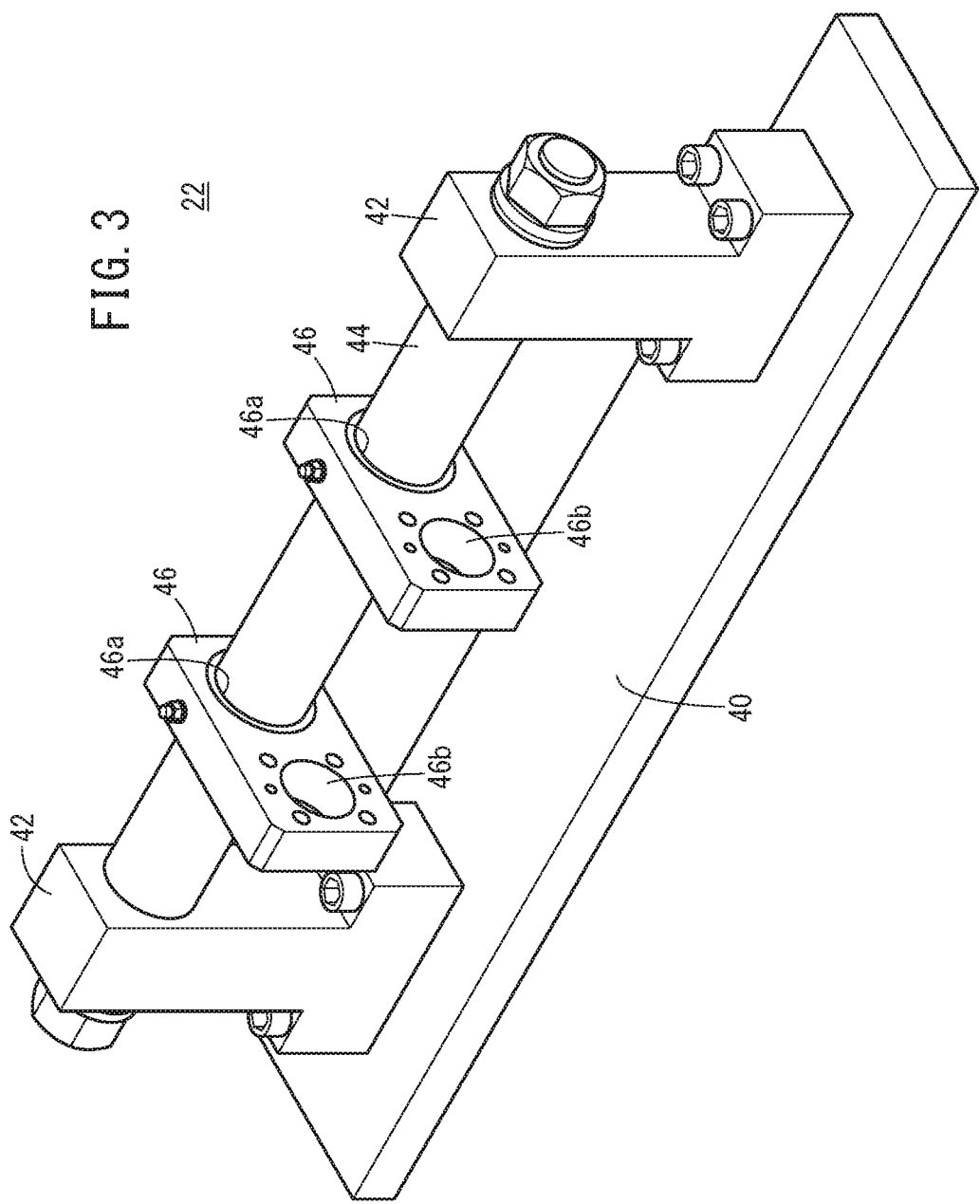
FIG. 3 is a perspective view showing a configuration of a coupling unit shown in FIG. 1.
Figure 4:
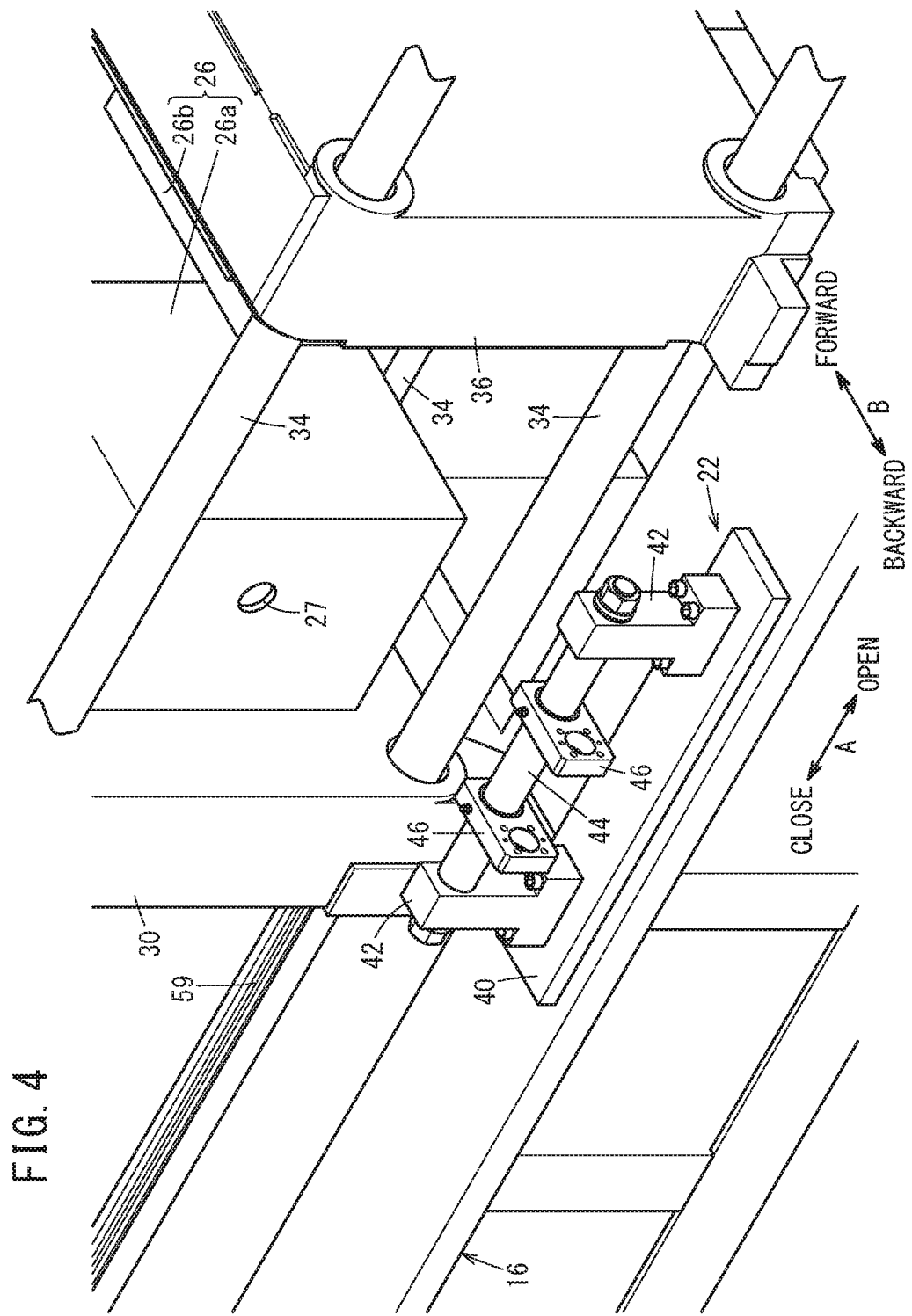
FIG. 4 is a perspective view showing a state where the coupling unit shown in FIG. 3 is placed on a machine base shown in FIG. 1.

Next, the coupling unit 22 will be described in more detail. FIG. 3 is a perspective view showing a configuration of the coupling unit 22. FIG. 4 is a perspective view showing a state where the coupling unit 22 is placed on the main machine base 16. The coupling unit 22 is arranged at such a position that, when the main machine base 16 and the sub machine base 20 are coupled, a nozzle 28a of the sub injection device 18 arranged on the sub machine base 20 can touch a sprue bush 27 (see FIG. 4) of the mold 26. More specifically, an installation position of the coupling unit 22 is near a position of the mold 26 of the clamping device 14 in Direction A, and is at one end portion side of the main machine base 16 in Direction B. The sprue bush 27 is arranged on a surface of the mold 26 at the sub injection device 18 side. Although not shown, a sprue bush corresponding to the nozzle 24a of the main injection device 12 is arranged on a surface of the mold 26 at the main injection device 12 side.

The coupling unit 22 includes a base 40, two fixed blocks 42, 42, a guide bar 44, and two movable blocks 46, 46. The base 40 is detachably mounted on the main machine base 16 by a bolt (not shown) or the like. Since the base 40 is attachable and detachable, the coupling unit 22 is attachable and detachable with respect to the main machine base 16. The base 40 supports (fixes) the two fixed blocks 42, 42. The base 40 is a flat plate of a substantially rectangular shape, and is installed on the main machine base 16 such that a longitudinal direction of the base 40 is parallel to Direction A.

The guide bar 44 is supported by the two fixed blocks 42, 42 and is bridged (extended, suspended) in parallel to Direction A (the axial direction of the tie bars 34). That is, one end of the guide bar 44 is fixed to one fixed block (first fixed block) 42 fixed to one end side of the base 40 in the longitudinal direction, and the other end of the guide bar 44 is fixed to the other fixed block (second fixed block) 42 fixed to the other end side of the base 40 in the longitudinal direction.

The two movable blocks 46, 46 are slidably fitted on the guide bar 44. That is, each of the two movable blocks 46, 46 includes an insertion hole 46a formed along Direction A. When the guide bar 44 is inserted in the insertion hole 46a, each of the movable blocks 46, 46 is slidably fitted on the guide bar 44. Further, in each of the two movable blocks 46, 46, a fitting hole 46b into which a coupling pin 68 (see FIG. 6) to be described later is fitted is formed along Direction A. The two movable blocks 46, 46 are disposed at a fixed interval so as to be fitted with respect to both end portion sides of the coupling pin 68. The two movable blocks 46, 46 are connected with the sub machine base 20 by the coupling pin 68.

Thus, the two movable blocks 46, 46 of the coupling unit 22 provided on the main machine base 16 are movable in Direction A with respect to the main machine base 16 (base 40). The movable blocks 46 are connected with the sub machine base 20. Consequently, it is possible to adjust the position of the sub injection device 18 in the direction A with respect to the main machine base 16 (clamping device 14, mold 26). Consequently, it is possible to adjust a touch position (nozzle touch position) of the nozzle 28a in the direction A so as to coincide with the position of the sprue bush 27 of the mold 26, and align the nozzle 28a with the sprue bush 27.

Another fixed block (third fixed block) 42 for fixing and supporting a center portion of the guide bar 44 may be further provided. The number of the movable blocks 46 may be one or may be three or more. FIG. 4 shows an example where the sprue bush 27 is formed in the fixed mold 26a. However, the sprue bush 27 may be formed in the movable mold 26b, or the sprue bush 27 may be formed at a boundary between the fixed mold 26a and the movable mold 26b.

Figure 5:
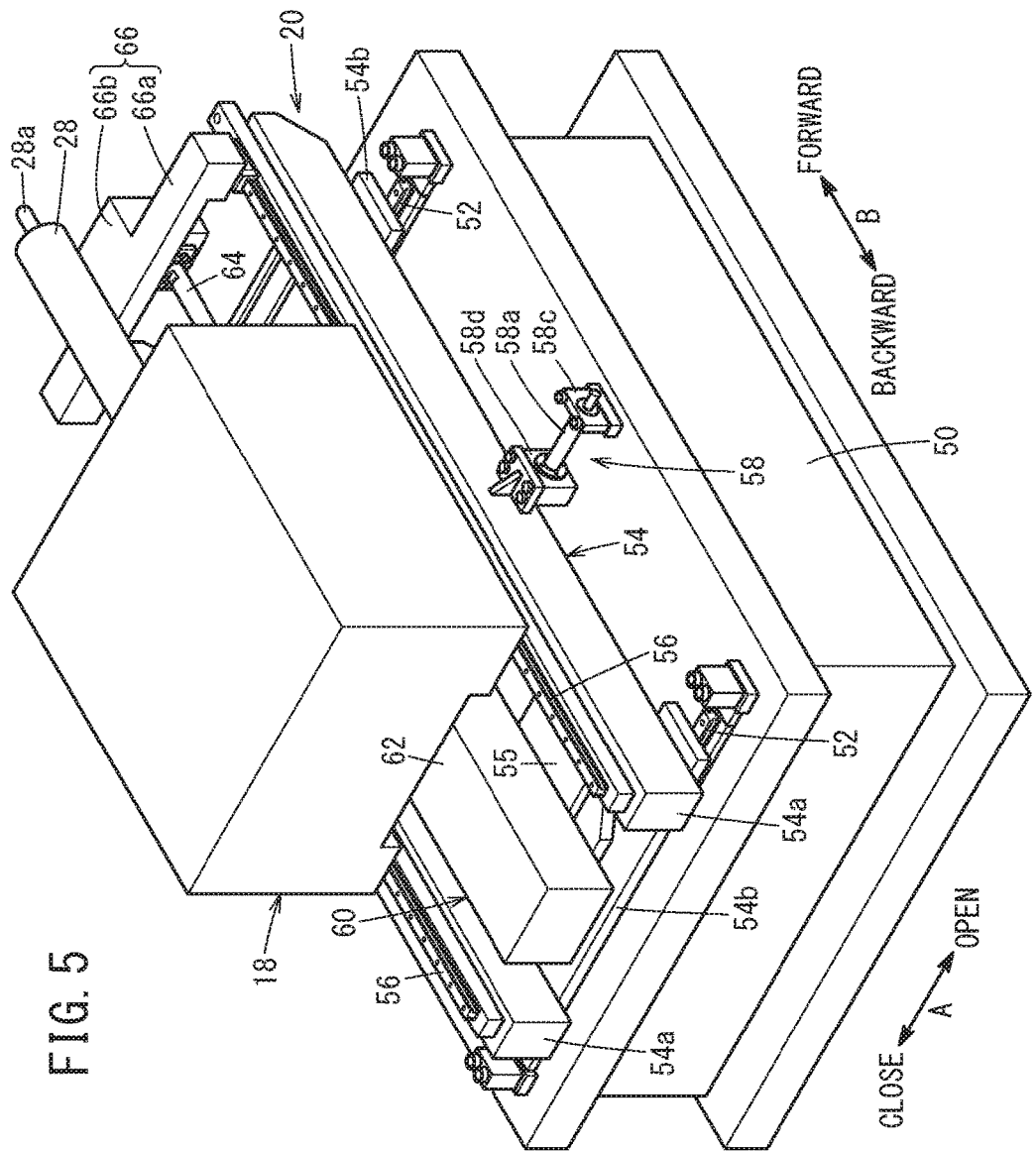
FIG. 5 is a perspective view of a sub injection device and a sub machine base shown in FIG. 1.
Figure 6:
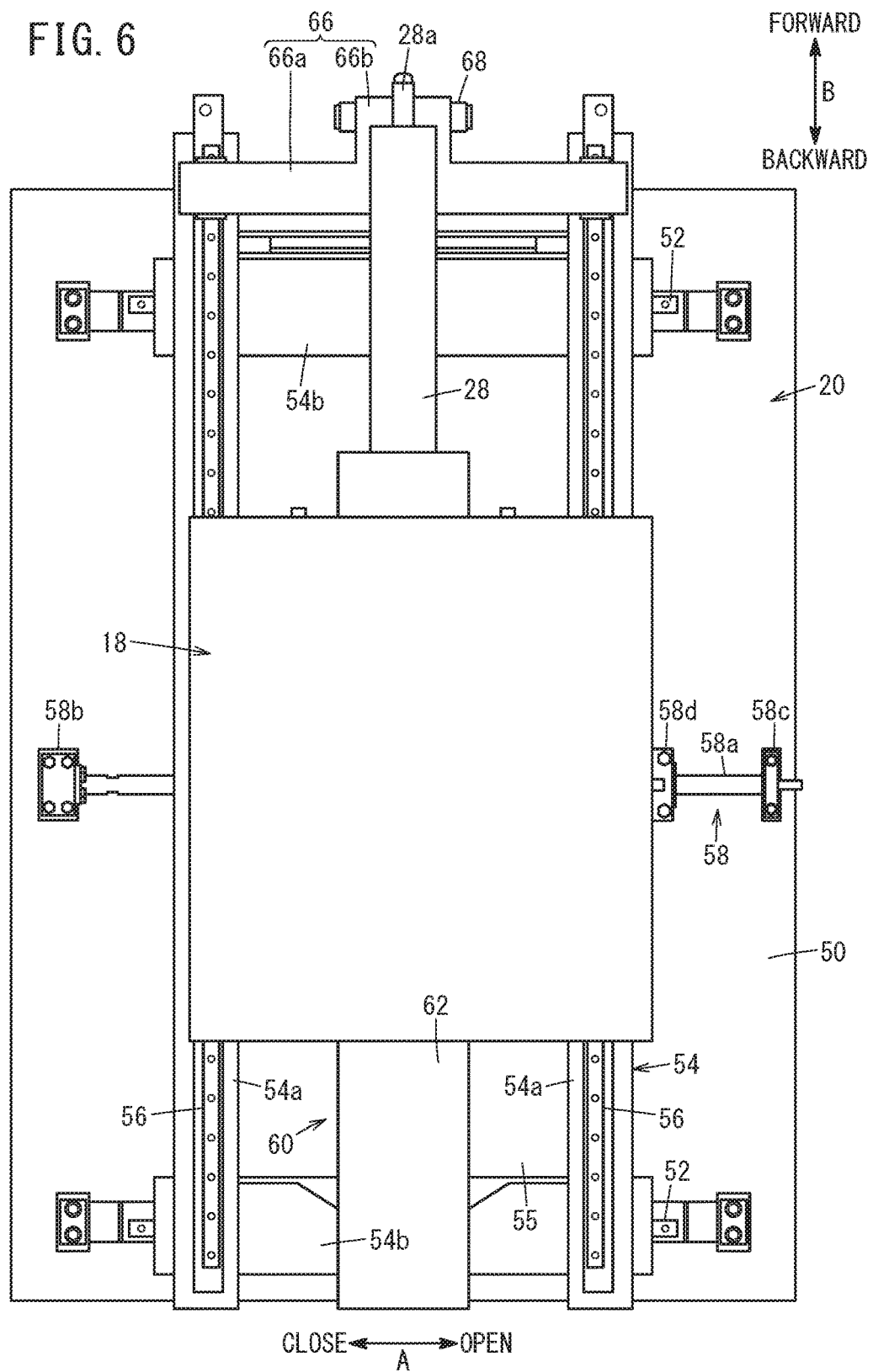
FIG. 6 is a plan view showing the sub injection device and the sub machine base shown in FIG. 5, as viewed from above.

Next, a structure of the sub machine base 20 will be described in more detail. FIG. 5 is a perspective view of the sub injection device 18 and the sub machine base 20. FIG. 6 is a plan view showing the sub injection device 18 and the sub machine base 20, as viewed from above. The sub machine base 20 supports the sub injection device 18 so as to enable movement of the sub injection device 18 in Direction A and Direction B.

The sub machine base 20 includes a fixed base 50, two guide rails 52, 52, a movable base 54, and two linear guide bearing portions 56, 56. The two guide rails 52, 52 are arranged on the fixed base 50 in parallel with Direction A. One guide rail 52 is arranged at one end side of the fixed base 50 in Direction B, and the other guide rail 52 is arranged at the other end side of the fixed base 50 in Direction B. The movable base 54 is supported on the fixed base 50 with the two guide rails 52, 52 interposed therebetween. The two guide rails 52, 52 support the movable base 54 on the fixed base 50 movably in Direction A with respect to the fixed base 50. The number of the guide rails 52 may be one, or three or more.

The two linear guide bearing portions 56, 56 are arranged on the movable base 54 in parallel with Direction B. One linear guide bearing portion 56 is arranged at one end side of the movable base 54 in Direction A, and the other linear guide bearing portion 56 is arranged at the other end side of the movable base 54 in Direction A. The sub injection device 18 is supported on the movable base 54 with the two linear guide bearing portions 56, 56 interposed therebetween. The two linear guide bearing portions 56, 56 support the sub injection device 18 on the movable base 54 movably in Direction B with respect to the movable base 54. The sub injection device 18 is supported on the movable base 54 such that the nozzle 28a of the injection cylinder 28 is directed to the mold 26 of the clamping device 14.

In the present embodiment, a motor 62 to be described later is disposed between the linear guide bearing portions 56, 56. Therefore, the movable base 54 is made up of two support members 54a, 54a on which the two linear guide bearing portions 56, 56 are arranged and which are disposed in parallel to Direction B, and two connection members 54b, 54b that connect lower portions of the two support members 54a, 54a. The two connection members 54b, 54b are connected to the two guide rails 52, 52 movably in Direction A. The number of linear guide bearing portions 56 may be one, or three or more. The motor 62 is arranged between the two support members 54a, 54a, and above the connection member 54b.

A feed screw unit 58 is attached to the fixed base 50 and the movable base 54. The feed screw unit 58 moves the movable base 54 in Direction A with respect to the fixed base 50. The feed screw unit 58 includes a feed screw 58a, an axial support member 58b that axially supports (supports) the feed screw 58a rotatably yet unmovably in the axial direction, an axial support member 58c that axially supports (supports) the feed screw 58a rotatably, and a nut portion 58d that is screw-engaged with the feed screw 58a. The two axial support members 58b, 58c are attached to the fixed base 50, and the nut portion 58d is attached to the movable base 54. Hence, when the feed screw 58a rotates, the movable base 54 moves in Direction A with respect to the fixed base 50. The feed screw 58a is rotated by driving of a servo motor (not shown) or is manually rotated (by operating a handle attached to an end portion thereof).

The main injection device 12 is also supported on the main machine base 16 with the two linear guide bearing portions 59 interposed therebetween (see FIG. 1 and the like). The linear guide bearing portions 59 enable movement of the main injection device 12 in Direction A.

Figure 7:
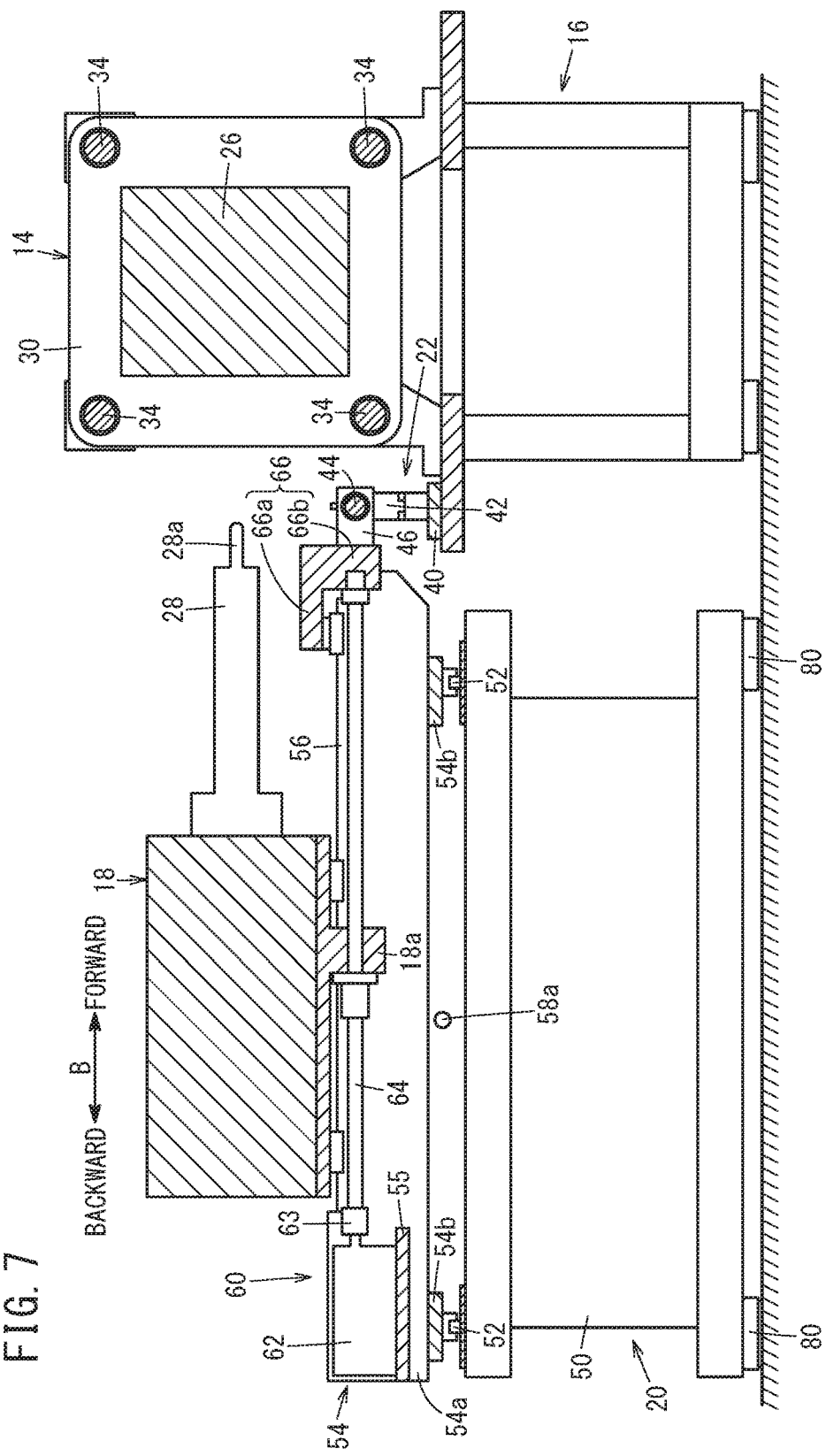
FIG. 7 is a cross-sectional view showing the injection molding machine shown in FIG. 2, taken along Direction B.

The sub machine base 20 is provided with a nozzle touch mechanism 60. The nozzle touch mechanism 60 is a mechanism that moves the sub injection device 18 in Direction B with respect to the movable base 54, and thereby causes the nozzle 28a of the sub injection device 18 to touch the sprue bush 27 (see FIG. 4) of the mold 26. The nozzle touch mechanism 60 will be described also with reference to FIG. 7. In this regard, movement of the nozzle 28a in a direction to approach the mold 26 will be referred to as forward movement, and movement of the nozzle 28a in a direction to move away from the mold 26 will be referred to as backward movement.

The nozzle touch mechanism 60 includes the motor 62 such as a servo motor, a ball screw 64, and a coupling support member 66. The motor 62 is fixed to the movable base 54, and is installed at an end portion of the movable base 54 on an opposite side (an opposite side of the nozzle 28a of the sub injection device 18) of the clamping device 14 in Direction B. The motor 62 is arranged above the connection member 54b of the movable base 54, and is fixed on a motor support member 55 that connects the two support members 54a, 54a. A rotary axis of the motor 62 and the ball screw 64 are connected to each other through a coupling portion 63. The ball screw 64 is screw-engaged with a screw-engagement portion 18a (see FIG. 7) of the sub injection device 18.

The coupling support member 66 axially supports (supports) a distal end of the ball screw 64 rotatably yet unmovably in the axial direction. Hence, when the ball screw 64 is rotated by driving of the motor 62, the sub injection device 18 moves in Direction B. That is, when the motor 62 rotates forward, the sub injection device 18 moves forward (moves in the direction to approach the clamping device 14), and when the motor 62 rotates reversely, the sub injection device 18 moves backward (moves in the direction to move away from the clamping device 14).

The coupling support member 66 is connected to the two movable blocks 46, 46 of the coupling unit 22 by the coupling pin 68. The coupling support member 66 is formed along Direction A so as to straddle the two linear guide bearing portions 56, 56 (support members 54a, 54a), and is supported on the movable base 54 (support members 54a, 54a) with the two linear guide bearing portions 56, 56 interposed therebetween. Consequently, the coupling support member 66 is movable in Direction B with respect to the movable base 54.

The coupling support member 66 can be fitted on the coupling pin 68, which is fitted with the two movable blocks 46, 46. Consequently, the coupling pin 68 can connect the coupling unit 22 and the coupling support member 66. Consequently, it is possible to couple the main machine base 16 and the sub machine base 20 together.

More specifically, the coupling support member 66 includes a Π-shaped base member 66a that is formed along Direction A so as to straddle the two linear guide bearing portions 56, 56 (support members 54a, 54a) and is supported on the movable base 54, and a protrusion portion 66b that protrudes from the base member 66a toward the clamping device 14 (mold 26). The ball screw 64 is axially supported rotatably by the protrusion portion 66b. The length of the protrusion portion 66b in a width direction (Direction A) is shorter than the length of the base member 66a in the width direction (Direction A).

A through hole (not shown) is formed in the protrusion portion 66b along Direction A. By inserting the coupling pin 68 in the through hole, the coupling pin 68 is fitted with the protrusion portion 66b. The coupling pin 68 is fitted with the protrusion portion 66b such that a central axis of the coupling pin 68 and a central axis of the ball screw 64 lie in the same horizontal plane. By fitting the coupling pin 68 into the protrusion portion 66b and the two movable blocks 46, 46 in a state where the two movable blocks 46, 46 are disposed at a fixed interval sandwiching the protrusion portion 66b from both end sides in Direction A, the coupling unit 22 and the coupling support member 66 are connected (see FIG. 1). By providing a height-adjustable mount 80 (see FIGS. 2 and 7) on a bottom portion of the fixed base 50 of the sub machine base 20, it is possible to position central axes of the coupling pin 68, the ball screw 64, and the guide bar 44 on the same horizontal plane.

Thus, the coupling support member 66 is supported on the movable base 54 that is movable in Direction A with respect to the fixed base 50, and is connected to the two movable blocks 46, 46 of the coupling unit 22 that can move in Direction A. Consequently, it is possible to easily adjust the position of the sub injection device 18 in Direction A with respect to the clamping device 14 (mold 26). Consequently, it is possible to easily adjust the touch position of the nozzle 28a with respect to the mold 26 in Direction A, and facilitate positioning between the nozzle 28a and the sprue bush 27 in Direction A.

Figure 8:
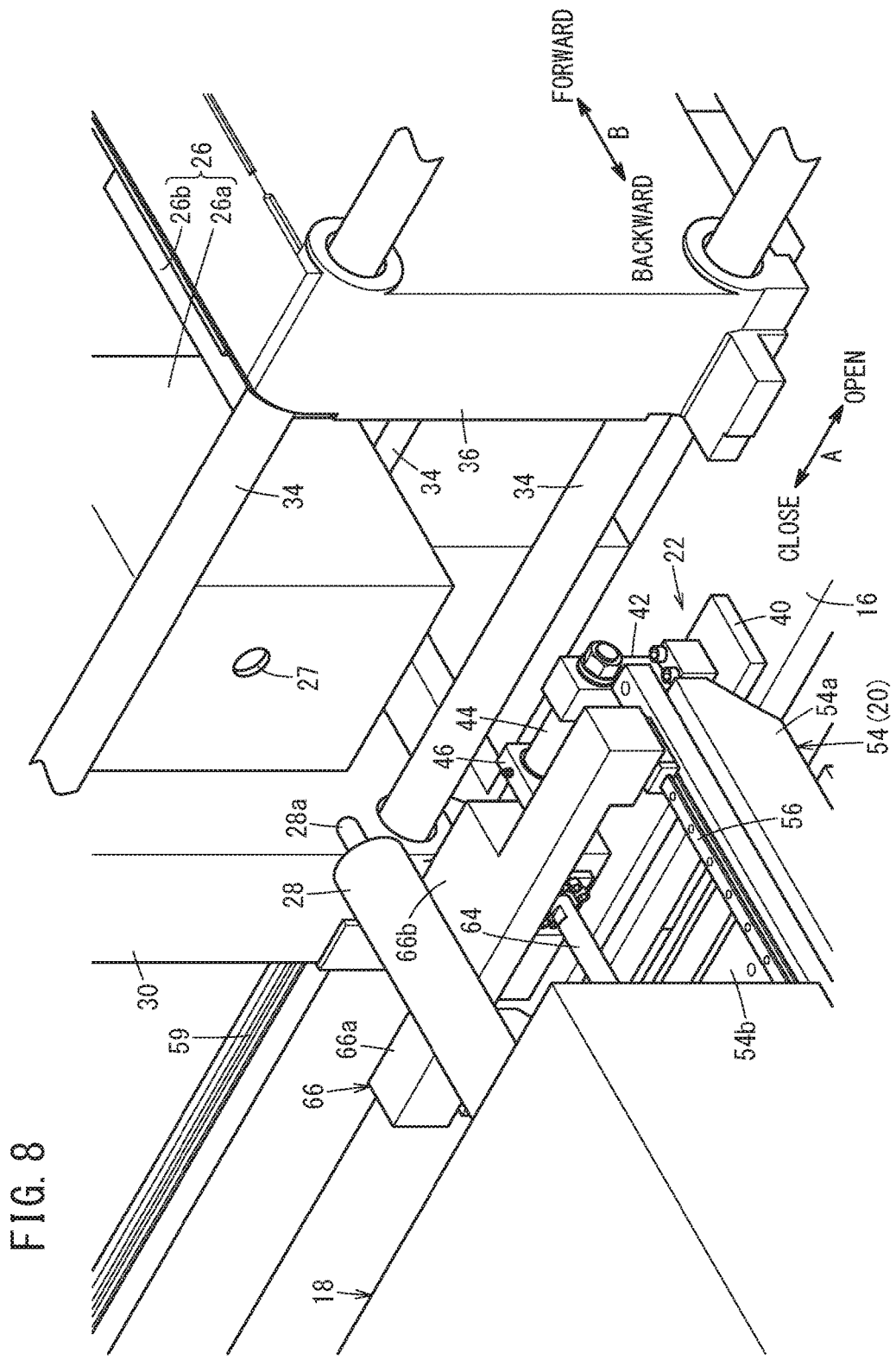
FIG. 8 is a perspective view showing a state where a coupling support member shown in FIG. 5 is connected to the coupling unit shown in FIG. 4 to thereby couple a machine base and the sub machine base.

FIG. 8 is a perspective view showing a state where the coupling unit 22 and the coupling support member 66 are connected, whereby the main machine base 16 and the sub machine base 20 are coupled. In order to perform injection molding in the state shown in FIG. 8, when the movable mold 26b is moved in a closing direction to close the mold 26, and then the motor 62 is driven to rotate (rotate forward) the ball screw 64, the sub injection device 18 moves forward along Direction B. After the nozzle 28a has been placed into contact with the sprue bush 27 of the mold 26, the sub injection device 18 is further moved forward, whereby a pressing force of the nozzle 28a against the mold 26 is produced. The pressing force is produced when the ball screw 64 pulls the coupling unit 22 in a direction to move away from the mold 26. The central axes of the coupling pin 68, the ball screw 64, and the guide bar 44 lie in the same plane by adjusting the mount 80, and the coupling support member 66 is supported by the two linear guide bearing portions 56, 56. Consequently, the guide bar 44 is pulled in the direction to move away from the mold 26 horizontally in Direction B.

The coupling unit 22 is fixed to the main machine base 16. Therefore, a moment to pull the main machine base 16 in a direction toward the sub injection device 18 by a force (reaction force) due to the pressing force acts on the main machine base 16. However, the main machine base 16 has such rigidity that the main machine base 16 is not deformed by the moment. Hence, an action and a reaction accompanying a pressing force are completely mechanically balanced between the main machine base 16 and the sub machine base 20. Hence, a moment action in a tilting direction of the sub injection device 18 and the nozzle 28a due to the pressing force of the nozzle touch is suppressed. Consequently, it is possible to suppress misalignment of the nozzle 28a and the mold 26 and perform stable molding.

In the case where the sprue bush 27 of the mold 26 is not positioned within an adjustment range of the nozzle 28a of the sub injection device 18 in Direction A, i.e., when positioning between the nozzle 28a and the sprue bush 27 in Direction A cannot be achieved even by moving the movable blocks 46 in Direction A, the installation position of the coupling unit 22 may be changed. When, as shown in, for example, FIGS. 9A and 9B, the thicknesses (the lengths in Direction A) of the fixed molds 26a provided with the sprue bushes 27 significantly differ from each other, so that the positions of the sprue bushes 27 in Direction A significantly change, the installation position of the coupling unit 22 may be shifted in Direction A.

[Modification]

The embodiment can be modified as follows.

(First Modification)

Figure 10:
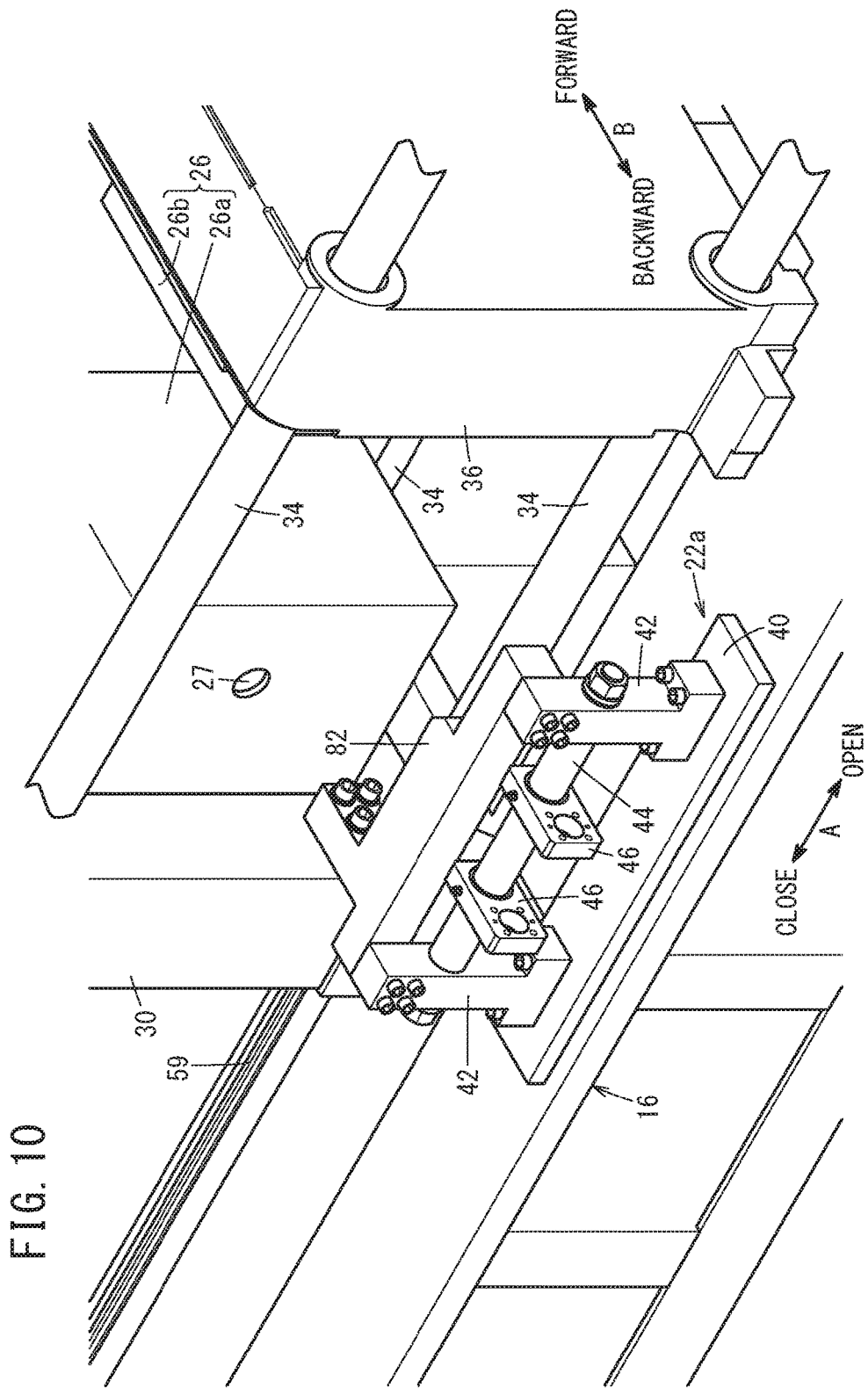
FIG. 10 is a perspective view showing a configuration of a coupling unit according to a first modification.

FIG. 10 is a perspective view showing a configuration of a coupling unit 22a according to the first modification. The same or similar components as or to those of the embodiment will be assigned the same reference numerals, and description thereof will be omitted.

The coupling unit 22a includes the base 40, the two fixed blocks 42, 42, the guide bar 44, and the two movable blocks 46, 46, and further includes a coupling block 82. The coupling block 82 couples (connects) the two fixed blocks 42, 42 and the fixed platen 30 together. The coupling block 82 is connected to surfaces of the two fixed blocks 42, 42 on the mold 26 side by a fixing member such as a bolt. The coupling block 82 is connected to the two fixed blocks 42, 42 above the two movable blocks 46, 46. The coupling block 82 is connected to a surface of the fixed platen 30 on the mold 26 (more specifically, the fixed mold 26a) side by a fixing member such as a bolt. Consequently, it is possible to reduce a force applied to the main machine base 16 due to the pressing force produced when the nozzle 28a of the sub injection device 18 touches the mold 26. That is, the force applied to the coupling unit 22a due to the pressing force is dispersed to the main machine base 16 and the fixed platen 30. Consequently, it is possible to reduce the force applied to the main machine base 16. As a result, it is possible to lower rigidity of the main machine base 16.

(Second Modification)

Figure 11:
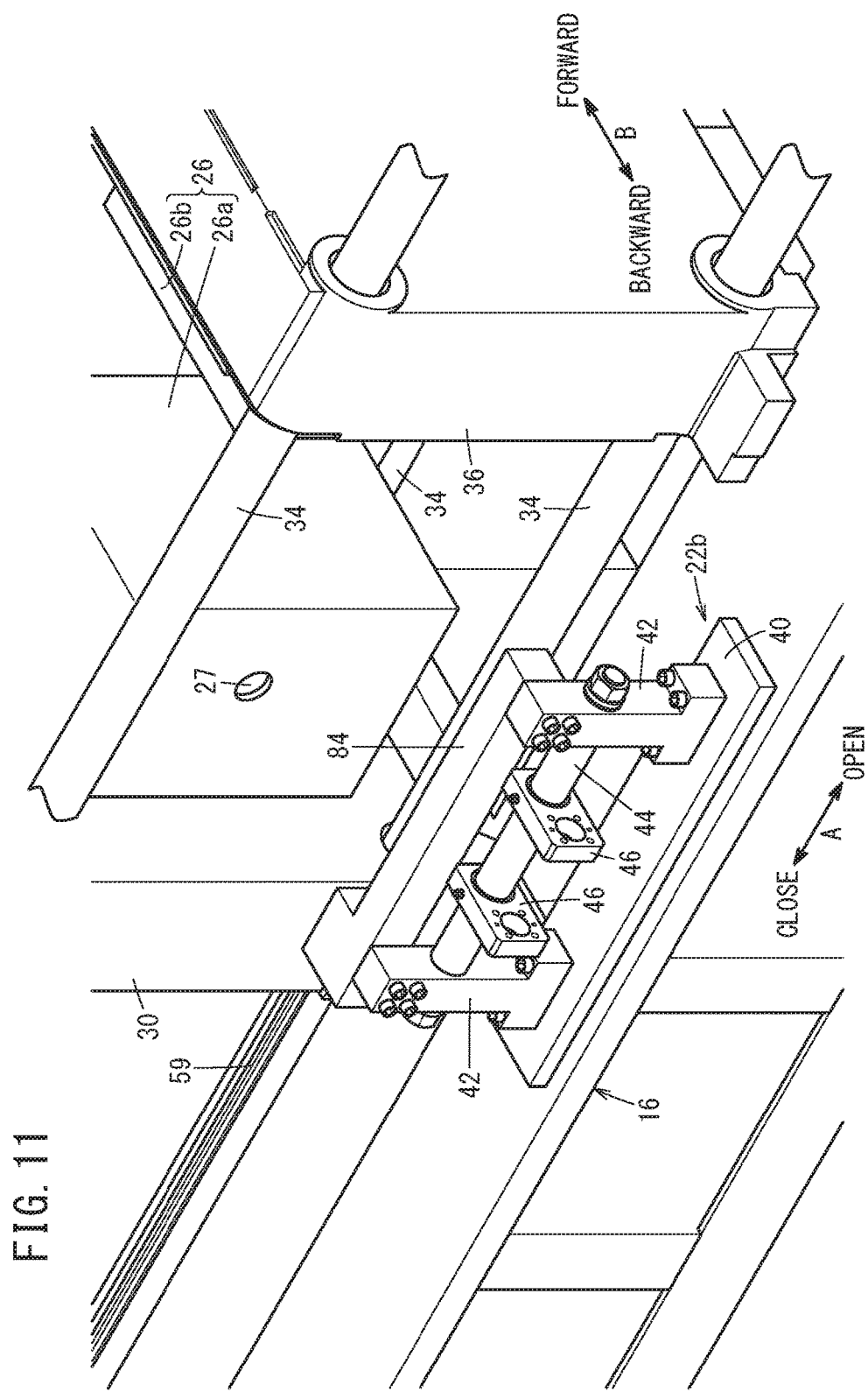
FIG. 11 is a perspective view showing a configuration of a coupling unit according to a second modification.

FIG. 11 is a perspective view showing a configuration of a coupling unit 22b according to the second modification. The same or similar components as or to those of the embodiment will be assigned the same reference numerals, and description thereof will be omitted.

The coupling unit 22b includes the base 40, the two fixed blocks 42, 42, the guide bar 44 and the two movable blocks 46, 46 and further includes a coupling block 84. The coupling block 84 couples (connects) the two fixed blocks 42, 42 and the fixed platen 30 together, as with the coupling block 82 according to the first modification. The coupling block 84 is connected to surfaces of the two fixed blocks 42, 42 on the mold 26 side by a fixing member such as a bolt. The coupling block 84 is connected to the two fixed blocks 42, 42 above the two movable blocks 46, 46. The coupling block 84 is connected to a surface of the fixed platen 30 on the sub injection device 18 (more specifically, the sub machine base 20) side by a fixing member such as a bolt. Thus, it is possible to reduce a force applied to the main machine base 16 due to the pressing force produced when the nozzle 28a of the sub injection device 18 touches the mold 26. That is, the force applied to the coupling unit 22b due to the pressing force is dispersed to the main machine base 16 and the fixed platen 30. Consequently, it is possible to reduce the force applied to the main machine base 16. As a result, it is possible to lower the rigidity of the main machine base 16.

(Third Modification)

In the embodiment, one sub injection device 18 and one sub machine base 20 are added (additionally installed) to the injection molding machine 10. However, a plurality of sub injection devices 18 and a plurality of sub machine bases 20 may be added (additionally installed). In this case, a plurality of coupling units 22 are provided on the main machine base 16.

Figure 12:
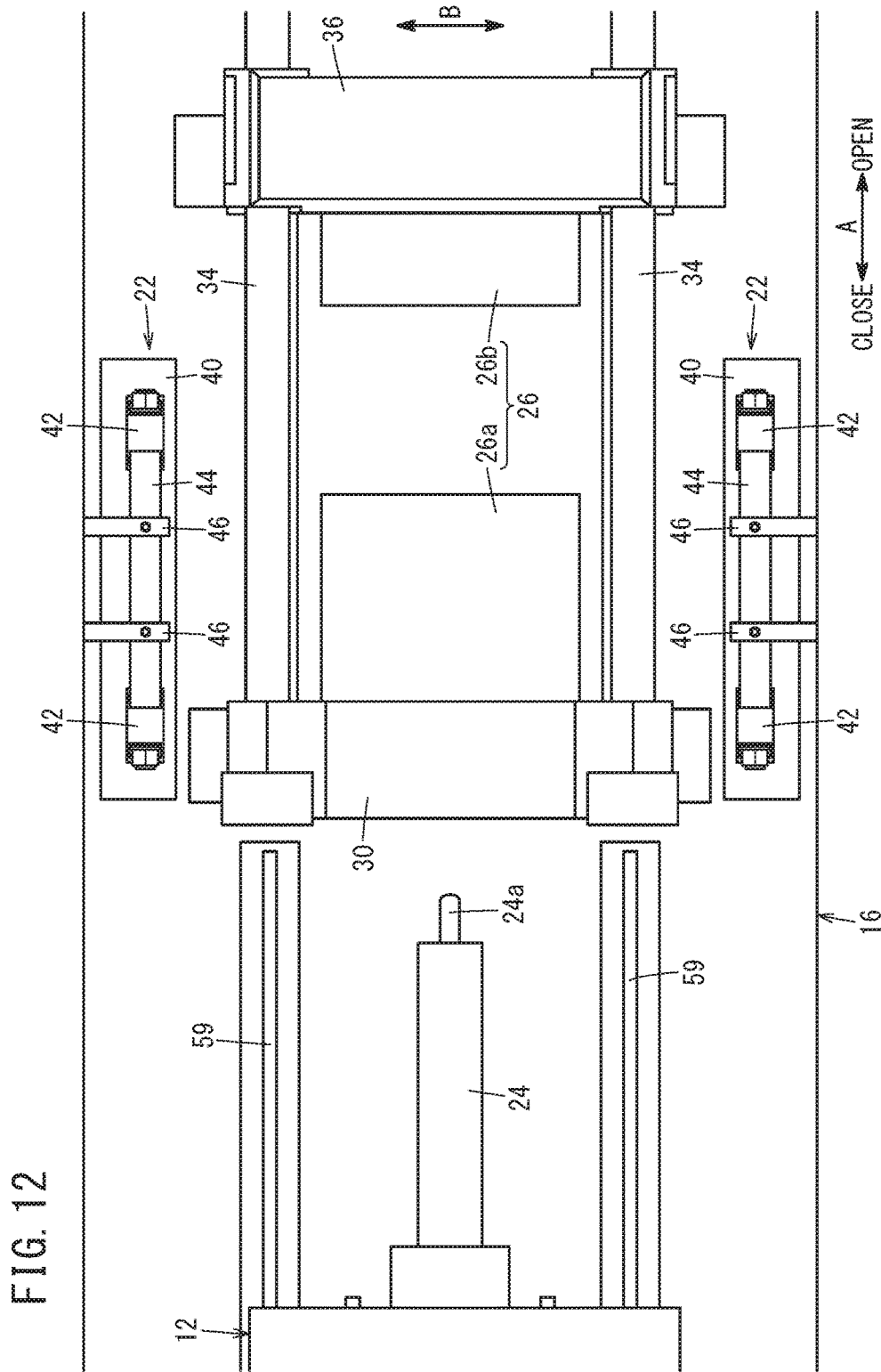
FIG. 12 is a plan view showing, as viewed from above, a state where two coupling units are disposed on the machine base.
Figure 13:
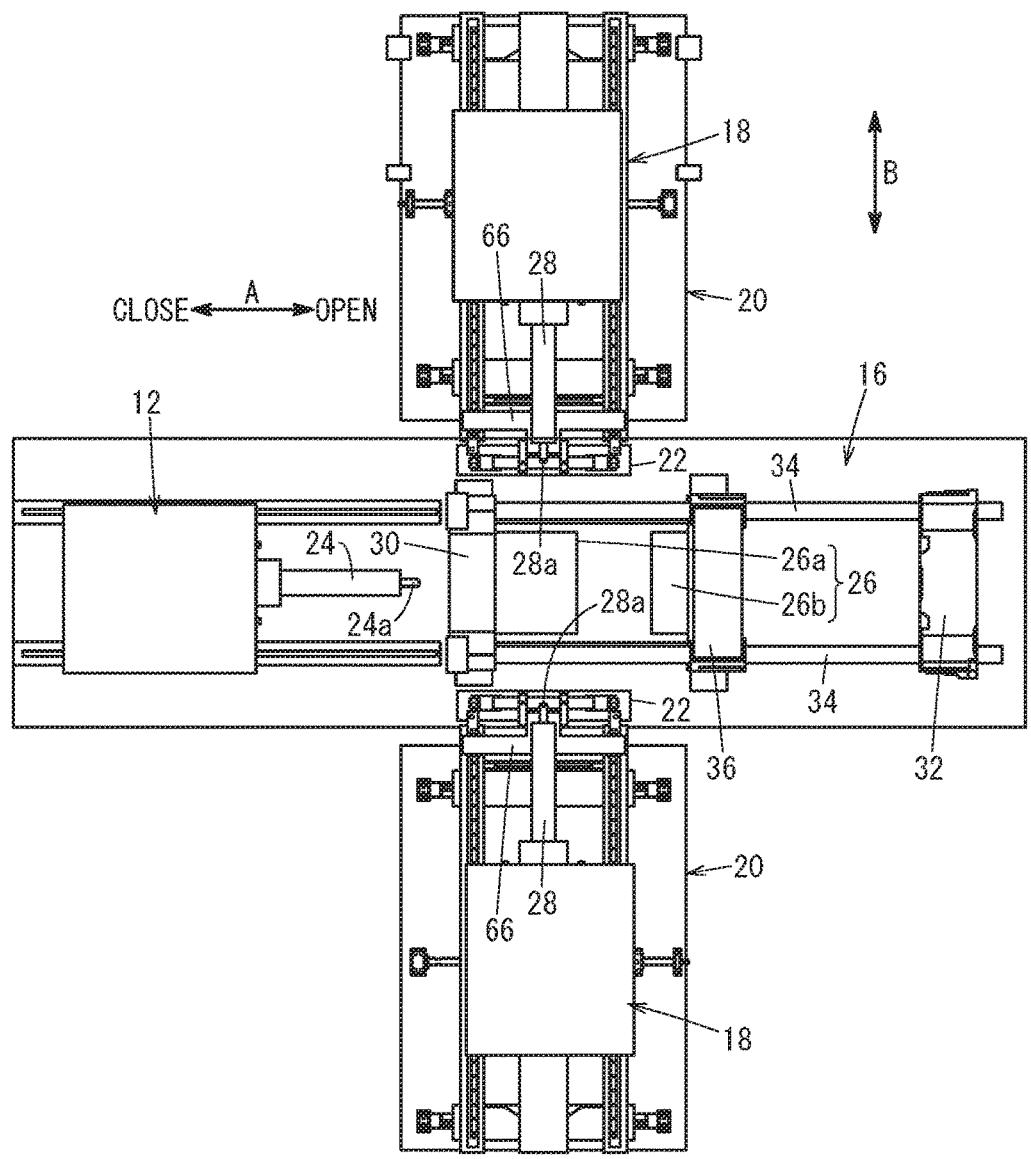
FIG. 13 is a plan view showing, as viewed from above, a state where the machine base and two sub machine bases provided with the sub injection devices are coupled to each other through the two coupling units shown in FIG. 12.

FIG. 12 is a plan view showing, as viewed from above, a state where the two coupling units 22 are disposed on the main machine base 16. FIG. 13 is a plan view showing, as viewed from above, a state where the main machine base 16 and the two sub machine bases 20 provided with the sub injection devices 18 are coupled through the two coupling units 22. The same or similar components as or to those of the embodiment will be assigned the same reference numerals.

The installation positions of the two coupling units 22 in Direction A are near the mold 26 of the clamping device 14, and, in Direction B, are on both end sides of the main machine base 16. Hence, the two sub injection devices 18 and the two sub machine bases 20 are connected to the main machine base 16 such that the nozzles 28a of the two sub injection devices 18 face each other. In the third modification, the sprue bushes 27 are formed respectively on both side surfaces of the mold 26 of the clamping device 14 in Direction B. The two sub machine bases 20 are coupled to the main machine base 16 through the coupling units 22 such that the nozzles 28a of the two sub injection devices 18 can touch the two sprue bushes 27.

Thus, the coupling unit 22 is attachable and detachable to and from the main machine base 16. Consequently, it is possible to additionally install the two or more sub injection devices 18 to the injection molding machine 10. The installation position of the coupling unit 22 installed on the main machine base 16 is not limited to that in FIG. 12, and the number of coupling units 22 on the main machine base 16 is arbitrary. For example, the two coupling units 22 may be disposed along Direction A at one end portion side of the main machine base 16 in Direction B, and one coupling unit 22 may be disposed at the other end portion side of the main machine base 16 in Direction B. In this case, the three sub injection devices 18 are additionally installed in the injection molding machine 10.

(Fourth Modification)

Figure 14:
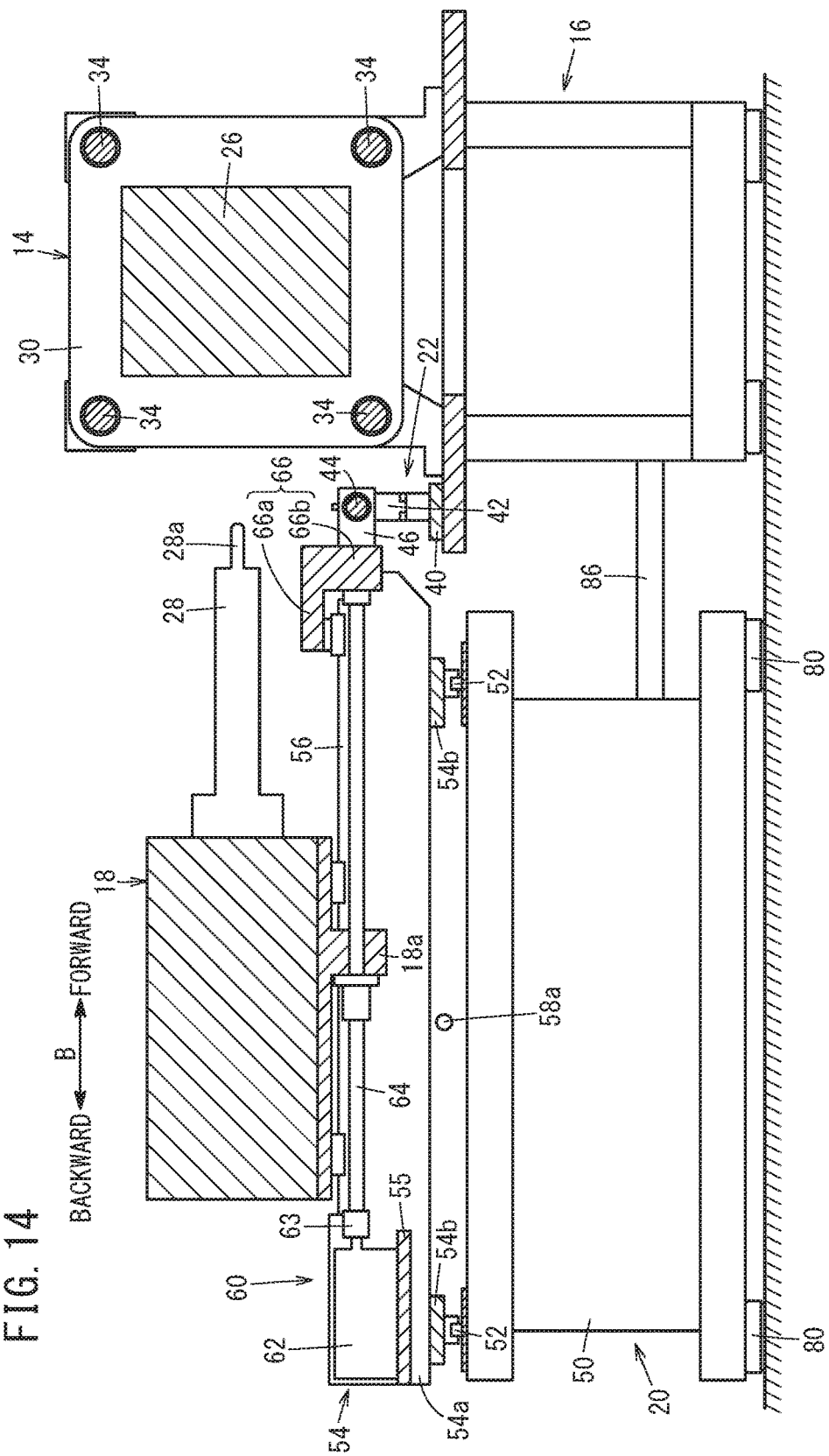
FIG. 14 is a cross-sectional view showing an injection molding machine according to a fourth modification, taken along Direction B.

FIG. 14 is a sectional view of the injection molding machine 10 according to the fourth modification, taken along Direction B. The same or similar components as or to those of the embodiment will be assigned the same reference numerals, and description thereof will be omitted.

During high cycle molding, there is a case where the movable platen 36 (movable mold 26b) of the clamping device 14 rapidly accelerates or rapidly decelerates, and this rapid acceleration or rapid deceleration may cause movement of the position of the main machine base 16. There is a case where such movement of the position of the main machine base 16 may cause an excessive load to be applied to the coupling unit 22, resulting in change of the relative position between the main machine base 16 and the sub machine base 20. Hence, a machine base coupling portion 86 that couples the main machine base 16 and the sub machine base 20 together is provided in order to maintain the relative position (relative positional relationship) between the main machine base 16 and the sub machine base 20. The machine base coupling portion 86 has strength to maintain the relative position with respect to the sub machine base 20 without deformation when the main machine base 16 moves.

The machine base coupling portion 86 is bridged between the main machine base 16 and the sub machine base 20 with one end screw-engaged into the main machine base 16 and the other end screw-engaged into the sub machine base 20. The machine base coupling portion 86 couples the main machine base 16 and the sub machine base 20 at lower portions thereof. Hence, the machine base coupling portion 86 couples the main machine base 16 and the sub machine base 20 below the coupling unit 22.

(Fifth Modification)

In the embodiment, the coupling support member 66 is supported on the movable base 54 with the two linear guide bearing portions 56, 56 interposed therebetween. However, the coupling support member 66 may be supported directly on the movable base 54 (support members 54a, 54a). In this case, the guide rails 52, 52 need to be rigid enough not to be deformed by a force due to the pressing force applied by the nozzle 28a against the mold 26, and enough to bear the pressing force.

(Sixth Modification)

Some of the first to fifth modifications may be arbitrarily combined in a way that does not cause inconsistency. For example, the first modification and the third modification may be combined according to one aspect, and the second, third and fourth modifications may be combined according to another aspect.

As described above, the injection molding machine 10 described in the embodiment or the first to fifth modifications includes the clamping device 14 that includes the mold 26 and produces a clamping force by opening and closing the mold 26, the main injection device 12 that injects molten resin in the mold 26 along the opening/closing direction of the mold 26, and the main machine base 16 that supports the clamping device 14 and the main injection device 12. Further, the injection molding machine 10 includes the sub injection device 18 that injects molten resin in the mold 26 along the direction perpendicular to the opening/closing direction of the mold 26, the sub machine base 20 that supports the sub injection device 18, and the coupling unit 22 (22a, 22b) that is arranged on the main machine base 16 and couples the main machine base 16 and the sub machine base 20 together. The coupling unit 22 (22a, 22b) includes the base 40 that is arranged on the main machine base 16, the two fixed blocks 42, 42 that are fixed to the base 40, the guide bar 44 that is bridged (extended, suspended) in parallel to the opening/closing direction of the mold 26 with one end supported by one fixed block 42 and with the other end supported by the other fixed block 42, and the movable block 46 that is slidably fitted onto the guide bar 44, and the movable block 46 is connected to the sub machine base 20.

Thus, by using the coupling unit 22 (22a, 22b) that couples the main machine base 16 and the sub machine base 20 together, it is possible to adjust the position of the sub injection device 18 in Direction A. Further, by using the coupling unit 22 (22a, 22b), it is possible to completely mechanically balance an action and a reaction accompanying a pressing force of the nozzle touch of the sub injection device 18 between the main machine base 16 and the sub machine base 20. As a result, it is possible to suppress the moment action in the tilting direction of the sub injection device 18 and the nozzle 28a due to the pressing force of the nozzle touch, and perform stable molding.

The injection molding machine 10 further includes the nozzle touch mechanism 60 that moves the sub injection device 18 including the nozzle 28a for injecting molten resin, in the direction perpendicular to the opening/closing direction of the mold 26 with respect to the sub machine base 20, and causes the nozzle 28a to touch the mold 26. Consequently, the nozzle 28a of the sub injection device 18 can touch the mold 26, and injection molding can be performed by the sub injection device 18.

The nozzle touch mechanism 60 includes the ball screw 64 that is rotated by driving of the motor 62, and is screw-engaged with the screw-engagement portion 18a of the sub injection device 18, and the coupling support member 66 that rotatably supports the ball screw 64 and is arranged on the sub machine base 20, and the coupling support member 66 is connected to the movable block 46. Owing thereto, the reaction force of the pressing force of the nozzle touch of the sub injection device 18 is transmitted to the main machine base 16 via the coupling unit 22 (22a, 22b). Consequently, it is possible to completely mechanically balance the action and the reaction accompanying the pressing force of the nozzle touch of the sub injection device 18 between the main machine base 16 and the sub machine base 20.

The sub injection device 18 is supported on the sub machine base 20 with the linear guide bearing portions 56 being interposed therebetween, and the linear guide bearing portions 56 enable movement of the sub injection device 18 in the direction perpendicular to the opening/closing direction of the mold 26 with respect to the sub machine base 20. Consequently, the sub injection device 18 can perform a nozzle touch operation.

The sub machine base 20 includes the fixed base 50, the guide rails 52 that are arranged on the fixed base 50 in parallel to the opening/closing direction of the mold 26, and the movable base 54 that is supported on the fixed base 50 with the guide rails 52 interposed therebetween, and can move in the opening/closing direction of the mold 26, and the movable base 54 is connected to the coupling unit 22 (22a, 22b). Consequently, it is possible to easily adjust the position of the sub injection device 18 in Direction A with respect to the clamping device 14 (mold 26).

The coupling unit 22a (22b) includes the coupling block 82 (84) that couples the two fixed blocks 42 and the fixed platen 30 that fixes the fixed mold 26a of the mold 26. With the above feature, the force applied to the coupling unit 22a (22b) due to the pressing force of the nozzle touch of the sub injection device 18 is dispersed to the main machine base 16 and the fixed platen 30. Consequently, it is possible to reduce the force applied to the main machine base 16. As a result, it is possible to lower the rigidity of the main machine base 16.

The machine base coupling portion 86 that couples the main machine base 16 and the sub machine base 20 below the coupling unit 22 (22a, 22b) is further provided in order to maintain the relative position between the main machine base 16 and the sub machine base 20. Consequently, even when rapid acceleration or rapid deceleration of the movable platen 36 of the clamping device 14 causes movement of the position of the main machine base 16, it is possible to maintain the relative position (relative positional relationship) between the main machine base 16 and the sub machine base 20.

In this regard, Japanese Laid-Open Patent Publication No. 2016-078384 discloses an injection molding device including a first injection machine that injects a resin material in a mold along an opening/closing direction of the mold, and a second injection machine that injects a resin material in the mold in a direction perpendicular to the opening/closing direction of the mold. Further, it discloses that the injection molding device further includes a moving mechanism that moves the second injection machine on a base so as to cause a nozzle of the second injection machine to touch the mold, and the moving mechanism is bridged between the second injection machine and the tie bars.

However, with a technique disclosed in Japanese Laid-Open Patent Publication No. 2016-078384, deflection of the tie bars cannot be completely suppressed even though the deflection is suppressed to an allowance value. Therefore, the technique has drawbacks of loss of a balance between the tie bars and a decrease in clamping accuracy. Therefore, there is a problem that stable molding cannot be performed or articles to be molded are limited. Coupling members of the moving mechanism are installed on the tie bars at positions on both sides of the nozzle of the second injection machine. Therefore, a movable range of a movable platen is narrow, and a mold size that can be used is also limited. Further, concerning coupling of the second injection machine and the tie bars by the moving mechanism, only a case where a force required for moving the second injection machine and a touch force are both small is taken into account. Therefore, the second injection machine is also limited to a small size. By contrast with this, the injection molding machine 10 according to the present embodiment and the modifications does not cause such a problem, and is useful.

While the invention has been particularly shown and described with reference to a preferred embodiment, it will be understood that variations and modifications can be effected thereto by those skilled in the art without departing from the scope of the invention as defined by the appended claims.

What is claimed is:

1. An injection molding machine comprising:
   a clamping device including a mold and configured to produce a clamping force by opening and closing the mold;
   an injection device configured to inject molten resin into the mold along an opening/closing direction of the mold; and
   a machine base configured to support the clamping device and the injection device, wherein: the injection molding machine further comprises:
   a sub injection device configured to inject molten resin into the mold along a direction perpendicular to the opening/closing direction of the mold;
   a sub machine base configured to support the sub injection device; and
   a coupling unit provided on the machine base and configured to couple the machine base and the sub machine base together;
   wherein the coupling unit includes:
   a base provided on the machine base;
   two fixed blocks fixed to the base;
   a guide bar supported by and bridged between the two fixed blocks in parallel to the opening/closing direction of the mold; and
   a movable block slidably fitted onto the guide bar,
   the movable block is connected to the sub machine base, and
   the sub injection device is supported on the sub machine base with a linear guide bearing portion interposed therebetween, the linear guide bearing portion being configured to enable movement of the sub injection device with respect to the sub machine base in the direction perpendicular to the opening/closing direction of the mold.

2. The injection molding machine according to claim 1, further comprising a nozzle touch mechanism configured to move the sub injection device having a nozzle configured to inject molten resin, with respect to the sub machine base in the direction perpendicular to the opening/closing direction of the mold, and thereby cause the nozzle to touch the mold.

3. The injection molding machine according to claim 2, wherein:
   the nozzle touch mechanism includes:
   a ball screw configured to be rotated by driving of a motor and screw-engaged with a screw-engagement portion of the sub injection device; and
   a coupling support member configured to rotatably support the ball screw and provided on the sub machine base, and
   the coupling support member is connected to the movable block.

4. The injection molding machine according to claim 1, wherein the coupling unit further includes a coupling block configured to couple the two fixed blocks and a stationary platen configured to fix a fixed mold of the mold.

5. The injection molding machine according to claim 1, further comprising a machine base coupling portion configured to couple the machine base and the sub machine base below the coupling unit to maintain a relative position between the machine base and the sub machine base.

6. An injection molding machine comprising:
a clamping device including a mold and configured to produce a clamping force by opening and closing the mold;
an injection device configured to inject molten resin into the mold along an opening/closing direction of the mold; and
a machine base configured to support the clamping device and the injection device, wherein:
the injection molding machine further comprises:
a sub injection device configured to inject molten resin into the mold along a direction perpendicular to the opening/closing direction of the mold;
a sub machine base configured to support the sub injection device; and
a coupling unit provided on the machine base and configured to couple the machine base and the sub machine base together;
wherein the coupling unit includes:
a base provided on the machine base;
two fixed blocks fixed to the base:
a guide bar supported by and bridged between the two fixed blocks in parallel to the opening/closing direction of the mold; and
a movable block slidably fitted onto the guide bar, the movable block is connected to the sub machine base, the sub machine base includes:
a fixed base;
a guide rail provided on the fixed base in parallel to the opening/closing direction of the mold; and
a movable base supported on the fixed base with the guide rail interposed there between, the movable base being movable in the opening/closing direction of the mold; and
the movable base is connected to the coupling unit.

7. The injection molding machine according to claim 6, further comprising a nozzle touch mechanism configured to move the sub injection device having a nozzle configured to inject molten resin, with respect to the sub machine base in the direction perpendicular to the opening/closing direction of the mold, and thereby cause the nozzle to touch the mold.

8. The injection molding machine according to claim 7, wherein:
the nozzle touch mechanism includes:
a ball screw configured to be rotated by driving of a motor and screw-engaged with a screw-engagement portion of the sub injection device; and
a coupling support member configured to rotatably support the ball screw and provided on the sub machine base, and the coupling support member is connected to the movable block.

9. The injection molding machine according to claim 6, wherein the coupling unit further includes a coupling block configured to couple the two fixed blocks and a stationary platen configured to fix a fixed mold of the mold.

10. The injection molding machine according to claim 6, further comprising a machine base coupling portion configured to couple the machine base and the sub machine base below the coupling unit to maintain a relative position between the machine base and the sub machine base.

11. An injection molding machine comprising:
a clamping device including a mold and configured to produce a clamping force by opening and closing the mold;
an injection device configured to inject molten resin into the mold along an opening/closing direction of the mold; and
a machine base configured to support the clamping device and the injection device, wherein:
the injection molding machine further comprises:
a sub injection device configured to inject molten resin into the mold along a direction perpendicular to the opening/closing direction of the mold;
a sub machine base configured to support the sub injection device; and
a coupling unit provided on the machine base and configured to couple the machine base and the sub machine base together; wherein
the coupling unit includes:
a base provided on the machine base;
two fixed blocks fixed to the base;
a guide bar supported by and bridged between the two fixed blocks in parallel to the opening/closing direction of the mold; and
a movable block slidably fitted onto the guide bar, the movable block is connected to the sub machine base, and
the sub injection device is supported on the sub machine base with a linear guide bearing portion interposed therebetween, the linear guide bearing portion being configured to enable movement of the sub injection device with respect to the sub machine base in the direction perpendicular to the opening/closing direction of the mold, the sub machine base includes:
a fixed base;
a guide rail provided on the fixed base in parallel to the opening/closing direction of the mold; and
a movable base supported on the fixed base with the guide rail interposed therebetween, the movable base being movable in the opening/closing direction of the mold; and
the movable base is connected to the coupling unit.

12. The injection molding machine according to claim 11, further comprising a nozzle touch mechanism configured to move the sub injection device having a nozzle configured to inject molten resin, with respect to the sub machine base in the direction perpendicular to the opening/closing direction of the mold, and thereby cause the nozzle to touch the mold.

13. The injection molding machine according to claim 12, wherein:
the nozzle touch mechanism includes:
a ball screw configured to be rotated by driving of a motor and screw-engaged with a screw-engagement portion of the sub injection device; and
a coupling support member configured to rotatably support the ball screw and provided on the sub machine base, and the coupling support member is connected to the movable block.

14. The injection molding machine according to claim 11, wherein the coupling unit further includes a coupling block configured to couple the two fixed blocks and a stationary platen configured to fix a fixed mold of the mold.

15. The injection molding machine according to claim 11, further comprising a machine base coupling portion configured to couple the machine base and the sub machine base below the coupling unit to maintain a relative position between the machine base and the sub machine base.

* * * * *